(12) United States Patent
Ohara et al.

(10) Patent No.: US 10,946,919 B2
(45) Date of Patent: Mar. 16, 2021

(54) MUDGUARD MEMBER FOR SADDLED VEHICLE

(71) Applicant: HONDA MOTOR CO., LTD., Tokyo (JP)

(72) Inventors: Takeshi Ohara, Wako (JP); Yoshihide Yuza, Wako (JP); Takashi Sasaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 303 days.

(21) Appl. No.: 16/066,485

(22) PCT Filed: Dec. 22, 2016

(86) PCT No.: PCT/JP2016/088367
§ 371 (c)(1),
(2) Date: Jun. 27, 2018

(87) PCT Pub. No.: WO2017/115716
PCT Pub. Date: Jul. 6, 2017

(65) Prior Publication Data
US 2019/0009851 A1    Jan. 10, 2019

(30) Foreign Application Priority Data
Dec. 28, 2015   (JP) .............................. JP2015-256491

(51) Int. Cl.
*B62J 15/00*     (2006.01)
*B29C 70/68*     (2006.01)
(Continued)

(52) U.S. Cl.
CPC .............. *B62J 15/00* (2013.01); *B29C 70/68* (2013.01); *B29K 2067/00* (2013.01); *B29K 2105/08* (2013.01); *B29L 2031/30* (2013.01)

(58) Field of Classification Search
CPC ... B60R 2019/1853; B62J 15/00; B62J 15/02; B62J 15/04; B62J 7/04; B62J 9/23;
(Continued)

(56) References Cited

U.S. PATENT DOCUMENTS 2,277,666 A * 3/1942 Jackson ................... B62J 15/04
280/852
4,946,721 A    8/1990 Kindervater et al.
(Continued)

FOREIGN PATENT DOCUMENTS

CN    1242320 A    1/2000
CN    1363496 A    8/2002
(Continued)

OTHER PUBLICATIONS

Extended European search report dated Oct. 14, 2019 in the corresponding EP Patent Application No. 16881691.6.
(Continued)

*Primary Examiner* — Steve Clemmons
(74) *Attorney, Agent, or Firm* — Carrier Blackman & Associates, P.C.; William D. Blackman; Joseph P. Carrier (57) ABSTRACT

A mudguard member for a saddled vehicle covering above a rear wheel, a rear fender as a mudguard member is formed from fiber-reinforced resin. The rear fender has a surface provided with a resin-made reinforcing rib, the surface facing toward the rear wheel. The rear fender is formed in an elongated shape including: a vehicle attached portion that is arranged at a vehicle-front-side; and a length extension portion that extends from the vehicle attached portion toward the rear of the vehicle body. The length extension portion has a top panel and side panels that extend obliquely downward from both vehicle-widthwise sides of the top panel. The reinforcing rib includes: longitudinal ribs that extend from the vehicle attached portion to a vehicle-
(Continued)

longitudinal center of the length extension portion; and transverse ribs that are arranged in a grip pattern in conjunction with the longitudinal ribs.

16 Claims, 9 Drawing Sheets

(51) Int. Cl.
*B29K 67/00* (2006.01)
*B29K 105/08* (2006.01)
*B29L 31/30* (2006.01)

(58) Field of Classification Search
CPC .......... B62J 25/08; B29C 70/22; B29C 70/26; B29C 70/68
See application file for complete search history.

(56) References Cited

U.S. PATENT DOCUMENTS

| | | | | |
|---|---|---|---|---|
| 4,982,973 | A | * | 1/1991 | Saito ................ B60K 11/08 |
| | | | | 180/229 |
| 5,139,306 | A | * | 8/1992 | Ott .................... B60R 13/04 |
| | | | | 24/290 |
| 5,356,588 | A | | 10/1994 | Hara et al. |
| D512,669 | S | * | 12/2005 | Manchester ............. D12/186 |
| 8,864,002 | B2 | * | 10/2014 | Iida ..................... B62J 9/00 |
| | | | | 224/413 |
| 8,905,419 | B2 | * | 12/2014 | Nakamura ............ B60K 13/02 |
| | | | | 280/219 |
| 8,979,132 | B2 | * | 3/2015 | Matsushima .......... B62J 15/04 |
| | | | | 180/68.3 |
| 2008/0290625 | A1 | * | 11/2008 | Kuo-Chung ............ B62J 15/02 |
| | | | | 280/152.1 |
| 2010/0096825 | A1 | * | 4/2010 | Nagao ................... B62J 15/00 |
| | | | | 280/152.05 |
| 2011/0073627 | A1 | | 3/2011 | Iida et al. |

FOREIGN PATENT DOCUMENTS

| | | | | |
|---|---|---|---|---|
| CN | 103318327 | A | | 9/2013 |
| EP | 0547625 | B1 | * | 9/1997 ....... B29C 45/14786 |
| EP | 2 759 461 | A1 | | 7/2014 |
| JP | S63-82894 | A | | 4/1988 |
| JP | H01-222935 | A | | 9/1989 |
| JP | H05-124556 | A | | 5/1993 |
| JP | H05-253959 | A | | 10/1993 |
| JP | 08034378 | A | * | 2/1996 |
| JP | H0834378 | A | | 2/1996 |
| JP | H11217094 | A | | 8/1999 |
| JP | 2001138972 | A | | 5/2001 |
| JP | 2001138972 | A | * | 5/2001 ............. B62J 15/00 |
| JP | 2010-047164 | A | | 3/2010 |
| JP | 2012-025286 | A | | 2/2012 |
| JP | 2012025286 | A | * | 2/2012 |
| JP | 2014-141200 | A | | 8/2014 |
| JP | 2015-227099 | A | | 12/2015 |

OTHER PUBLICATIONS

Office Action dated Jul. 18, 2019 issued in corresponding Chinese Patent Application No. 201680076080.6 with the English translation thereof.

Form PCT/Ib/338 and English translation of the International Preliminary Report on Patentability (PCT/IPEA/409) from International Application PCT/JP2016/088367.

* cited by examiner

MUDGUARD MEMBER FOR SADDLED VEHICLE

TECHNICAL FIELD

The present invention relates to a mudguard member for a saddled vehicle and, more specifically, to a mudguard member for a saddled vehicle which is placed above a wheel to catch splashes of mud and the like.

BACKGROUND ART

A structure is conventionally studied to enhance deformation resistance when external force is applied to a mudguard member which is placed above a wheel of a saddled vehicle.

Patent Document 1 discloses the configuration of a mudguard member with stiffness increased in a manner that a bag-shaped holder with an opening facing toward the vehicle body is formed in each of both vehicle-widthwise outer ends of the mudguard member, and a frame member extending out from the vehicle body is inserted into the holder.

PRIOR ART DOCUMENT

Patent Document

Patent Document 1: JP H05-124556 A

SUMMARY OF INVENTION

Problem to be Solved by Invention

However, in the mudguard member according to Patent Document 1, there is a problem that both the size and the weight of the mudguard member are increased because the bag-shaped holder is formed.

The purpose of the present invention is to solve the above problems in the prior art and to provide a mudguard member for a saddled vehicle which enables an increase of the stiffness while an increase of the weight is inhibited.

Means for Solving Problems

To achieve the afore-mentioned purpose, the present invention has a first feature in that a mudguard member for a saddled vehicle covers above a vehicle wheel (WR), wherein the mudguard member is formed from fiber-reinforced resin, and the mudguard member has a surface provided with a reinforcing rib made of resin, the surface facing toward the vehicle wheel (WR).

The present invention has a second feature in that the mudguard member is formed in a shape elongated in a vehicle longitudinal direction, the mudguard member includes a vehicle attached portion that is arranged at one end in the vehicle longitudinal direction, and a length extension portion that extends from the vehicle attached portion to the other end, and the length extension portion has a top panel and side panels that extend obliquely downward from both vehicle-widthwise sides of the top panel.

The present invention has a third feature in that the reinforcing rib includes longitudinal ribs that extend from the vehicle attached portion to a vehicle-longitudinal center of the length extension portion.

The present invention has a fourth feature in that the reinforcing rib includes transverse ribs that extend in a direction of a vehicle width.

The present invention has a fifth feature in that the longitudinal ribs and the transverse ribs are coupled to each other.

The present invention has a sixth feature in that the longitudinal rib is placed along a bend located between the top panel and the side panel.

The present invention has a seventh feature in that the transverse rib includes a plate-shaped portion in surface contact with the length extension portion, and an upright portion arranged upright from the plate-shaped portion.

The present invention has an eighth feature in that the longitudinal ribs and the transverse ribs are an integrated member configured by welding resin to a surface of the fiber-reinforced resin.

The present invention has a ninth feature in that the longitudinal ribs have ends on the vehicle attached portion side, the ends being coupled to receiving portions for fastening members used to attach the mudguard member to a vehicle body.

The present invention has a tenth feature in that the length extension portion has a perimeter edge covered with a molding member that is integrated with the reinforcing rib.

The present invention has a eleventh feature in that the fiber-reinforced resin includes fibers braided in two directions by 90 degrees, and in the length extension portion, the orientation directions of the fibers are inclined 45 degrees with respect to the vehicle longitudinal direction.

Advantageous Effects of Invention

According to the first feature, the mudguard member is formed from fiber-reinforced resin, and the mudguard member has a surface provided with a reinforcing rib made of resin, the surface facing toward the vehicle wheel (WR). In the configuration, the use of fiber-reinforced resin enables provision of a lightweight and thin mudguard member, and also the placement of the resin-made reinforcing rib enables an effective improvement in stiffness of a necessary portion only while reducing material cost. Further, the placement of the reinforcing rib on the underside of the mudguard member enables reinforcement of the mudguard member without prejudice to outward appearance.

According to the second feature, the mudguard member is formed in a shape elongated in a vehicle longitudinal direction, the mudguard member includes a vehicle attached portion that is arranged at one end in the vehicle longitudinal direction, and a length extension portion that extends from the vehicle attached portion to the other end, and the length extension portion has a top panel and side panels that extend obliquely downward from both vehicle-widthwise sides of the top panel. In the configuration, since the length extension portion has U-shaped cross section, it is possible to increase the stiffness of the length extension portion which has a high probability of application of external force.

According to the third feature, the reinforcing rib includes longitudinal ribs that extend from the vehicle attached portion to a vehicle-longitudinal center of the length extension portion. With the configuration, a bending position of the length extension portion when external force is applied to the length extension portion is able to be located away from the vehicle attached portion. This prevents the length extension portion from being caught in the vehicle wheel when the length extension portion is bent downward.

According to the fourth feature, the reinforcing rib includes transverse ribs that extend in a direction of a vehicle width. In the configuration, the transverse rib can serve the purpose of preventing deformation from appearing in the direction in which the U-shaped cross-section of the length extension portion is opened up. Therefore, it is possible to enhance deformation resistance of the length extension portion in the vertical direction.

According to the fifth feature, the longitudinal ribs and the transverse ribs are coupled to each other. In the configuration, the longitudinal ribs and the transverse ribs overlap to reinforce each other, so that the stiffness of the mudguard member can be effectively increased.

According to the sixth feature, the longitudinal rib is placed along a bend located between the top panel and the side panel. With the configuration, even if the dimensions in the height direction of the two longitudinal ribs are increased, the longitudinal ribs do not extend out from the length extension portion, and the stiffness of the mudguard member can be more increased.

According to the seventh feature, the transverse rib includes a plate-shaped portion in surface contact with the length extension portion, and an upright portion arranged upright from the plate-shaped portion. In the configuration, by virtue of the plate-shaped portion, the area of contact with the length extension portion can be increased to enhance the connectivity, and also by virtue of the upright portion, the stiffness of the entire transverse rib can be more increased.

According to the eighth feature, the longitudinal ribs and the transverse ribs are an integrated member configured by welding resin to a surface of the fiber-reinforced resin. With the configuration, the longitudinal ribs and the transverse ribs, which have a complicated shape, can be readily arranged on the surface of the fiber-reinforced resin.

According to the ninth feature, the longitudinal ribs have ends on the vehicle attached portion side, the ends being coupled to receiving portions for fastening members used to attach the mudguard member to a vehicle body. In the configuration, when the mudguard member is attached to the vehicle body, the end of the reinforcing rib is co-clamped, and therefore the stiffness of the mudguard member can be increased.

According to the tenth feature, the length extension portion has a perimeter edge covered with a molding member that is integrated with the reinforcing rib. In the configuration, the perimeter edge of the fiber-reinforced resin is covered with the resin-made member. This makes it possible to protect the hands of an occupant or the like when he/she grips the mudguard member to lift the vehicle body.

According to the eleventh feature, the fiber-reinforced resin includes fibers braided in two directions by 90 degrees, and in the length extension portion, the orientation directions of the fibers are inclined 45 degrees with respect to the vehicle longitudinal direction. With the configuration, even when the length extension portion is deformed upward or downward, stress applied to the fibers is easily dispersed, and thus surface whitening due to wrinkles and/or exfoliation can be minimized.

DESCRIPTION OF EMBODIMENTS

Figure 1:
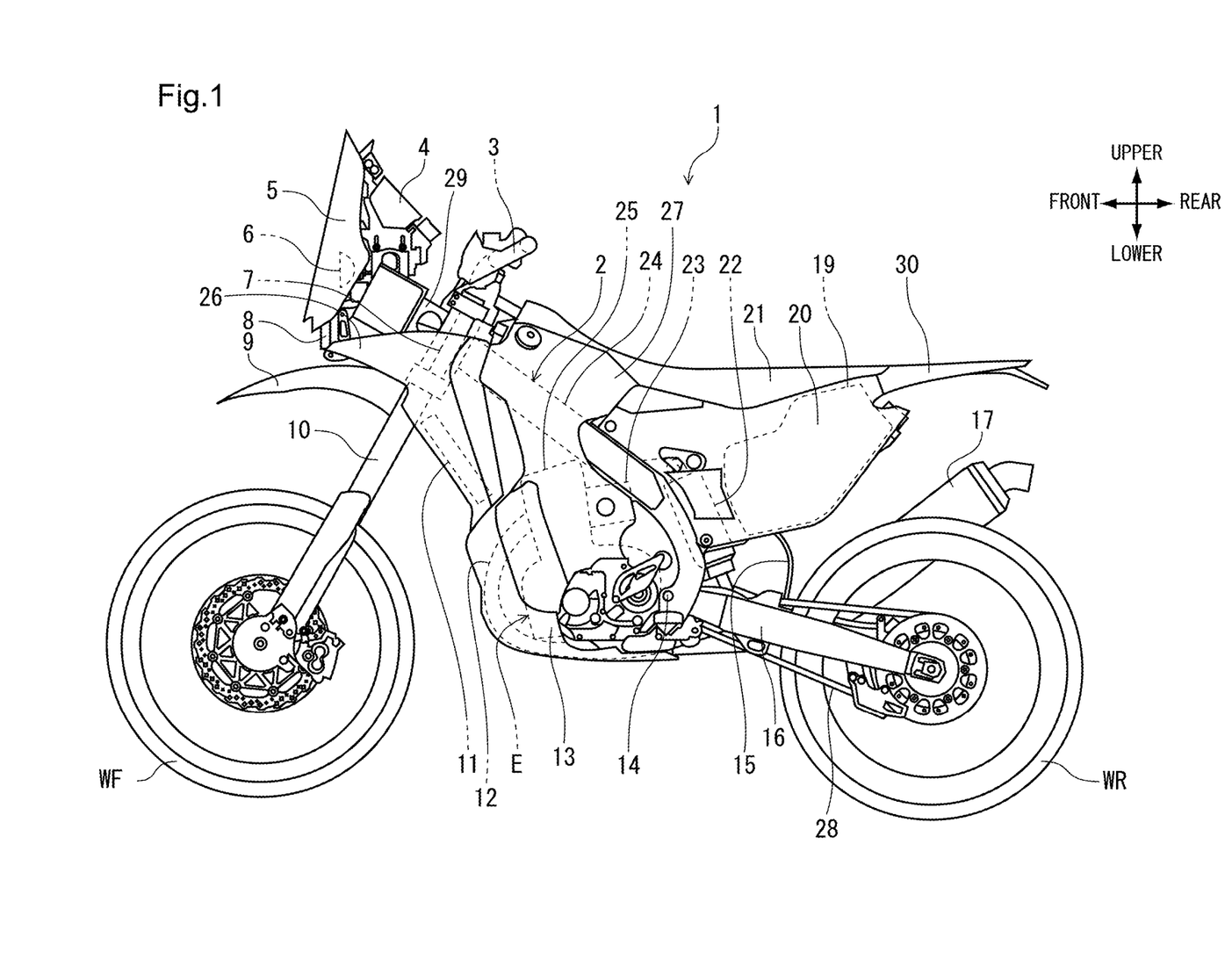
FIG. 1 is a left side view of a motorcycle to which a mudguard member for a saddled vehicle according to an embodiment of the present invention is applied.

Preferred embodiments according to the present invention will now be described in detail with reference to the accompanying drawings. FIG. 1 is a left side view of a motorcycle 1 to which a mudguard member for a saddled vehicle according to an embodiment of the present invention is applied. The motorcycle 1 is an off-road type saddled vehicle adapted to traveling on rough terrain.

A steering stem, which is not shown, is supported about an axis rotatably by a head pipe 7 which is placed in a front end of a main frame 24 forming part of a body frame 2. A pair of left and right front forks 10 which supports a front wheel WF about an axis rotatably is mounted on the steering stem. The front wheel WF can be steered through a steering handlebar 3 which is mounted to the top of the front forks 10.

A swing arm 16 which supports a rear wheel WR as a drive wheel about an axis rotatably is swingably supported by a pivot shaft in a lower rear portion of the main frame 24. The swing arm 16 is suspended from the main frame 24 by a rear cushion 22. A rear cover 15 is arranged rearward of the rear cushion 22 to catch splash of mud and the like thrown forward from the rear wheel WR.

An engine E is installed downward of the main frame 24. An exhaust pipe 12, which joins with a muffler 17 in a rearward part of the vehicle body, is installed on the vehicle front side of a cylinder head 25 of the engine E. Meanwhile, a throttle-body-integrated fuel injection system 23 and a not-shown air cleaner box are connected to the vehicle rear side of the cylinder head 25. The rotational drive force produced by the engine E is transmitted to the rear wheel WR through a drive chain 28.

A side cowl 27 is arranged in a position ranging from the side of the engine E to above the main frame 24. An under cowl 13, which joins with the side cowl 27, is mounted around the exhaust pipe 12. A non-shown oil tank and a cooling-water tank are placed on the inside of the side cowl 27 above the main frame 24. A front cowl 26, which joins with the side cowl 27, is mounted on the vehicle-widthwise outer sides of the front forks 10. A cooling-water radiator 11 is placed in a position on the inside of the front cowl 26 and also on the vehicle front side of the cylinder head 25.

A meter instrument 4 and a headlight 6 are mounted on a meter stay 29 extending forward from a head pipe 7, and the front of the meter instrument 4 and the headlight 6 is covered with a windscreen 5. An oil cooler 8 is placed below the windscreen 5, and further a front fender 9 is placed below the oil cooler 8 and the front fender 9 is attached to the front forks 10.

A pair of left and right large seat cowls 20 is mounted at the rear of the cylinder head 25 and above the main frame 24. A seat 21 is supported on an upper portion of the seat cowls 20 which are formed of a rigid member. A fuel tank 19 is placed on the inside of the seat cowls 20. A mudguard member according to the present invention is a rear fender 30 which joins with a rear end of the seat 21 and a rear end of the seat cowls 20 to cover above the rear wheel WR in order to catch splash of mud and the like thrown from the rear wheel WR.

Figure 2:
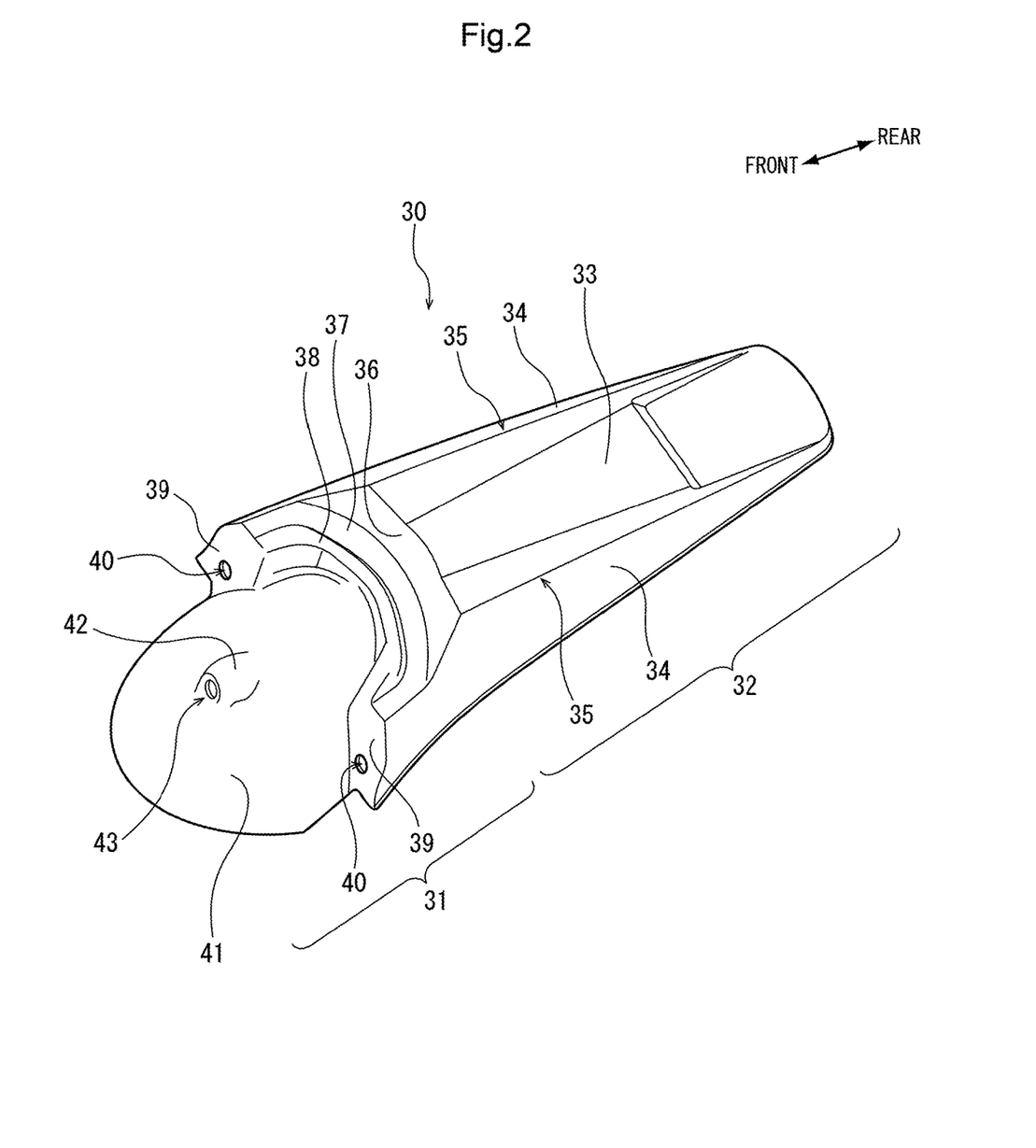
FIG. 2 is a perspective view of a rear fender as the mudguard member.
Figure 3:
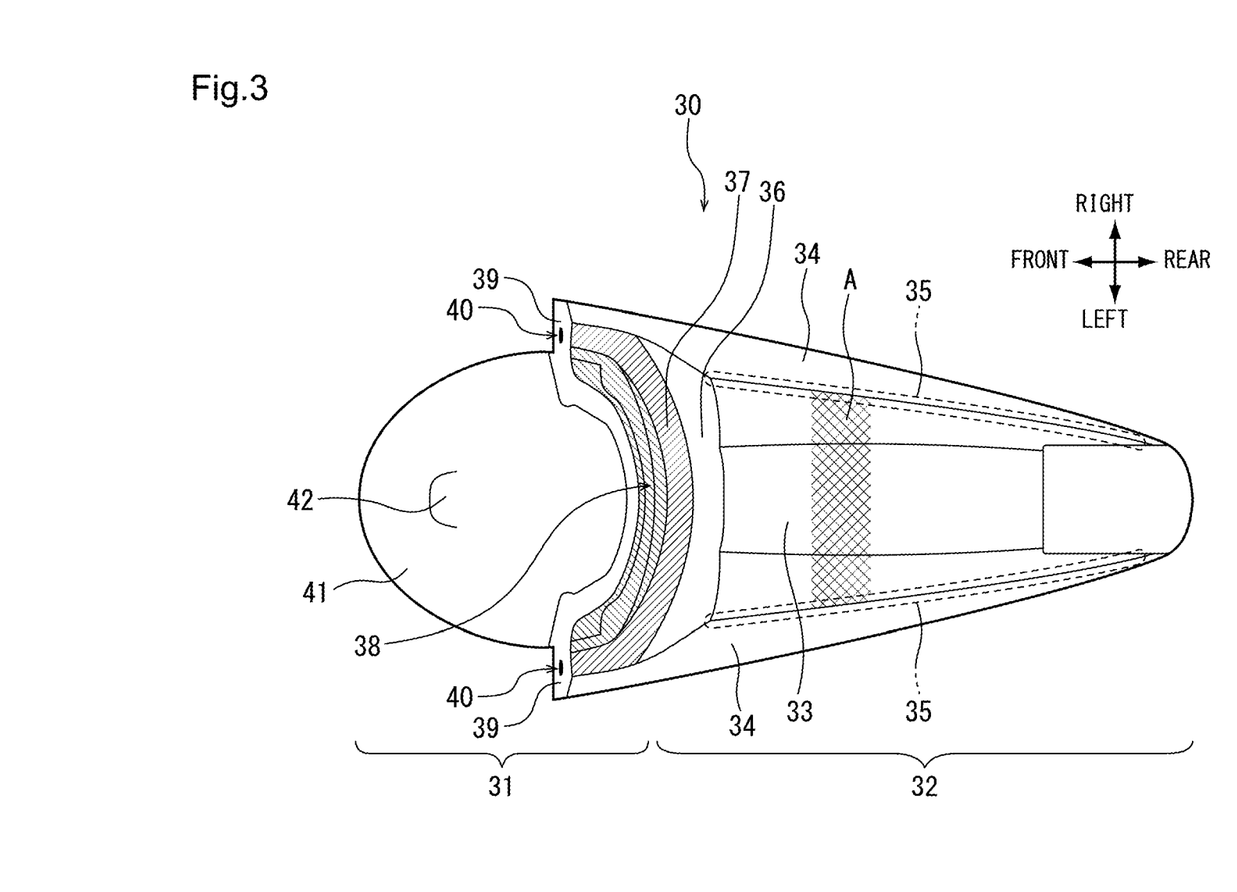
FIG. 3 is a plan view of the rear fender.
Figure 4:
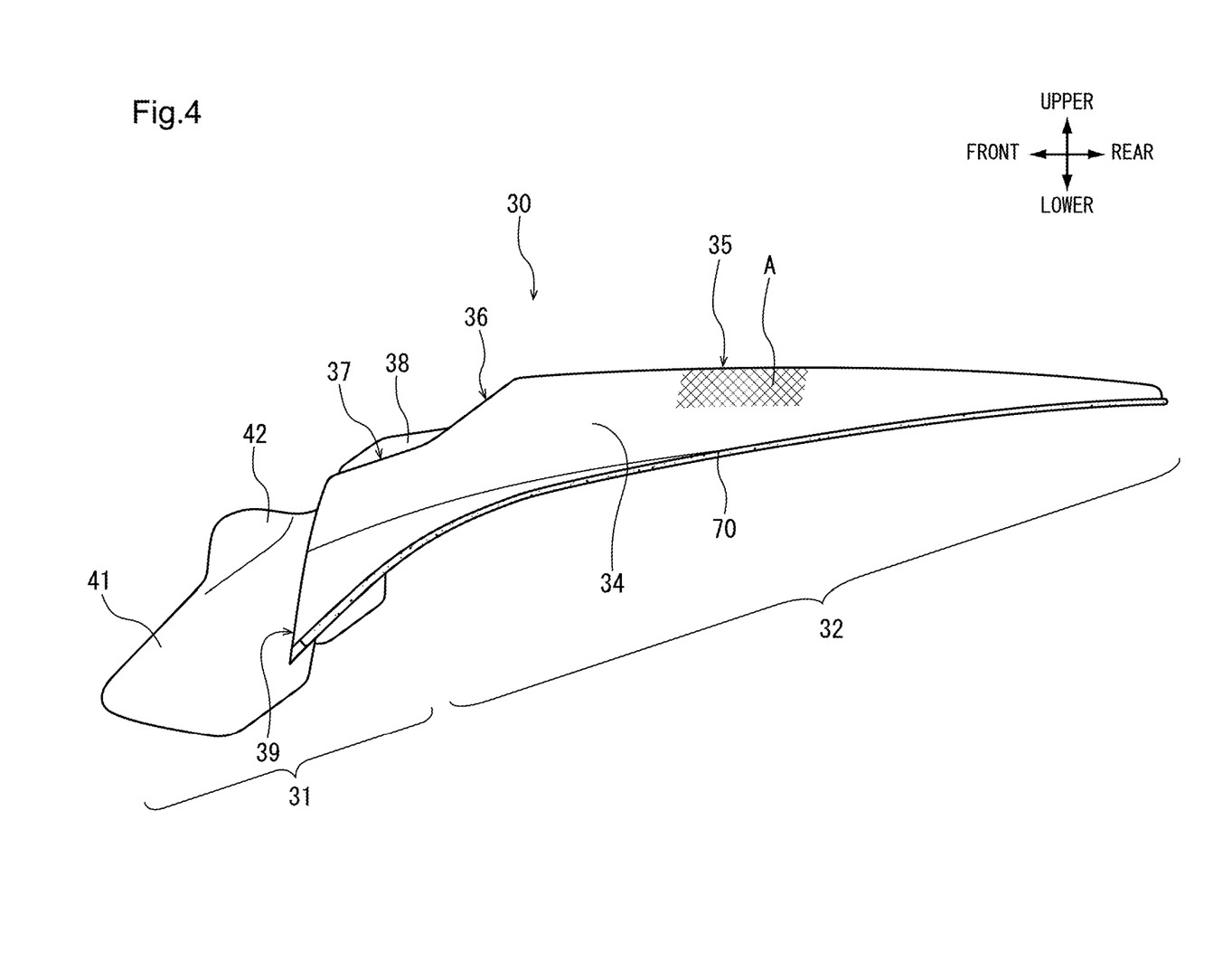
FIG. 4 is a left side view of the rear fender.

FIG. 2 is a perspective view of the rear fender 30 as a mudguard member. And FIG. 3 is a plan view of the same, and further FIG. 4 is a left side view of the same. A main body of the rear fender 30 is formed of fiber-reinforced resin in the form of thin plate which is produced by solidifying fiber material, such as carbon, glass, Kevlar and/or the like, with resin such as polyester and/or the like. The rear fender 30, which is formed in a shape elongated in the vehicle longitudinal direction, includes a vehicle attached portion 31 on the vehicle front side, and a length extension portion 32 on the vehicle rear side.

The vehicle attached portion 31 includes: a semi-round curved surface 41 for avoiding contact with the rear wheel WR; a vertical surface 39 serving as a surface secured to the vehicle body on the left and right sides in the vehicle width direction; an inclined surface 36 having contact with the rear end of the seat 21; a narrow belt-shaped flat surface 37 (the rightward slope hatched area in FIG. 3) which is curved as seen in a plan view; and a protuberance 38 (the leftward slop hatched area in FIG. 3) which is adjacent to the flat surface 37 and which protrudes upward. The vertical surface 39 has a through hole 40 formed therein for passage of a fastening member used to be attached to the vehicle body. Likewise, a bulge portion 42, which is formed approximately in the center of the curved surface 41, has a through hole 43 formed therein for passage of a fastening member.

The length extension portion 32 includes a plane-shaped top panel 33 and side panels, the top panel 33 being approximately horizontally oriented after being attached to the vehicle body, the side panels extending diagonally downward from both vehicle-widthwise sides of the top panel 33. Thereby, the length extension portion 32 has U-shaped cross section, and thus the deformation resistance to load applied in the vertical direction is increased.

The fiber in the fiber-reinforced resin consists of fibers braided in two directions by 90 degrees, and in the length extension portion 32, the fibers are arranged such that the orientation directions are inclined 45 degrees with respect to the vehicle longitudinal direction as illustrated in the schematic area A of FIGS. 3, 4. The rear fender 30 may possibly be bent by being used as a grip when the motorcycle 1 falls down as well as when an occupant, a mechanic and/or the like bears or tows the vehicle body. However, by virtue of the above-described contrivance relating to the fiber direction, dispersion of stress applied to the fibers is facilitated even when the length extension portion 32 is deformed upward or downward, and thereby surface whitening due to wrinkles and/or exfoliation is inhibited.

Referring to FIG. 4, the perimeter edge of the length extension portion 32 is covered with a molding member 70 made of resin without fiber. With this molding member 70, when an occupant, a mechanic and/or the like grips the length extension portion 32, the burden applied to his/her hands is reduced.

Figure 5:
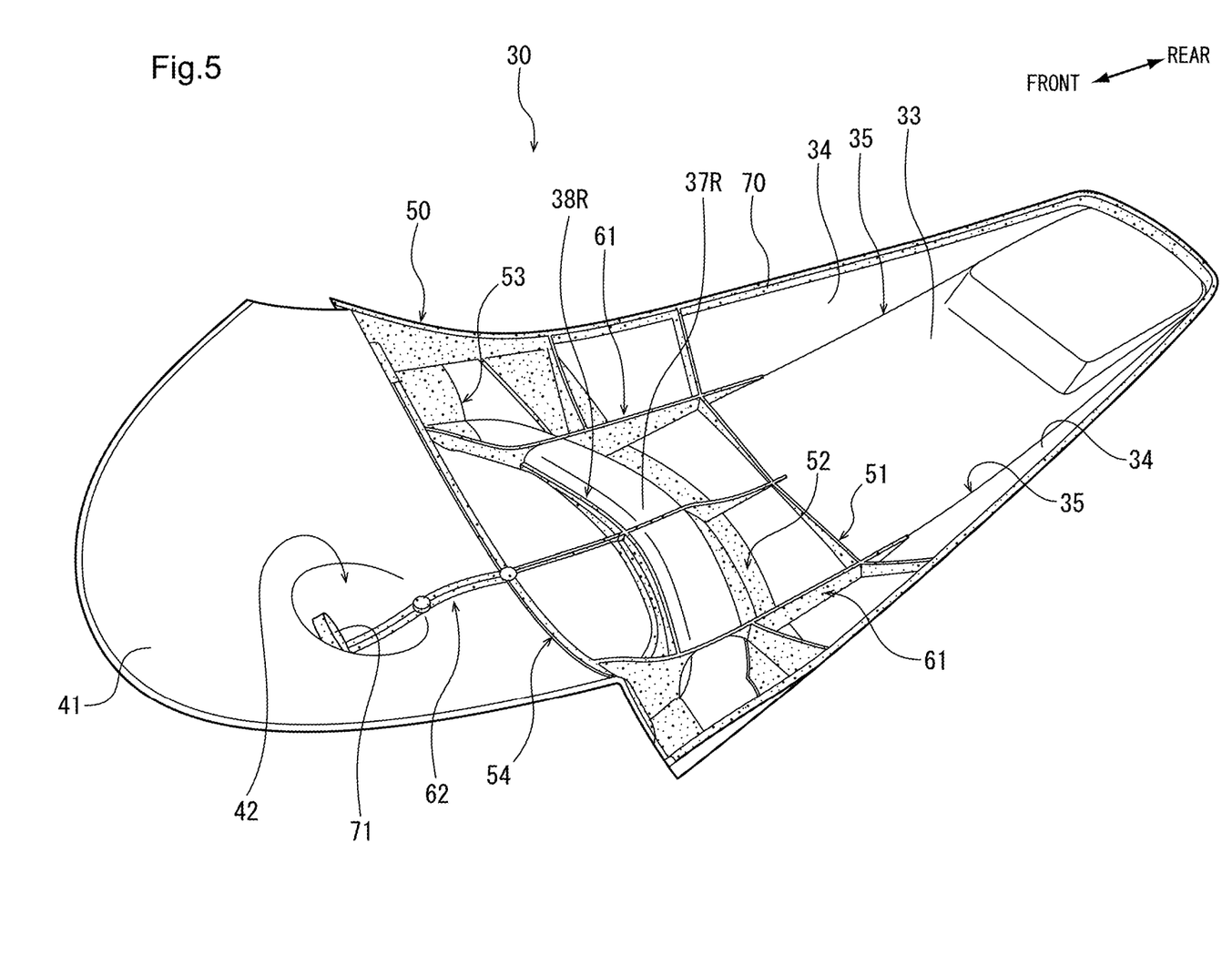
FIG. 5 is a perspective view of the underside of the rear fender.

FIG. 5 is a perspective view of the underside of the rear fender 30. A reinforcing rib 50 (the dot hatched area), which is made of resin without fiber, is provided on the underside of the rear fender 30, that is, the side facing toward the rear wheel WR. The reinforcing rib 50 is welded to the underside of the fiber-reinforced resin to form an integrally molded component, and the foregoing molding member 70 is also integrated with the reinforcing rib 50.

The reinforcing rib 50 includes: a total of three longitudinal ribs 61, 61, 62 oriented in the vehicle longitudinal direction; and a total of four transverse ribs 51, 52, 53, 54 oriented in the vehicle-width direction. The longitudinal ribs include a pair of left and right first longitudinal ribs 61, 61 and a second longitudinal rib 62 extending at the center in the vehicle-width direction. Also, the transverse ribs include a first transverse rib 51 on the vehicle rear side, a second transverse rib 52, a third transverse rib 53 and a fourth transverse rib 54. The vehicle front end of the second longitudinal rib 62 is coupled to a disc-shaped receiving portion 71 which is held in the bulge portion 42.

A part (main body) of fiber-reinforced resin of the rear fender 30 is a thin plate member of an approximately uniform thickness. The underside of the aforementioned flat surface 37 has an upward-convex hill 37R formed therein and the underside of the protuberance 38 has a downward-convex valley 38R formed therein.

The plane-shaped second transverse rib 52 is in surface contact with an area between the top panel 33 and the hill 37R. In other words, the second transverse rib 52 is welded mainly to the underside of the inclined surface 36 (see FIGS. 2, 3, 4) in order to reinforce the rear fender 30. Also, the third transverse rib 53 of U-shaped cross section is in surface contact with the valley 38R. That is, the third transverse rib 53 is welded to the underside of the protuberance 38 in order to reinforce the rear fender 30.

Figure 6:
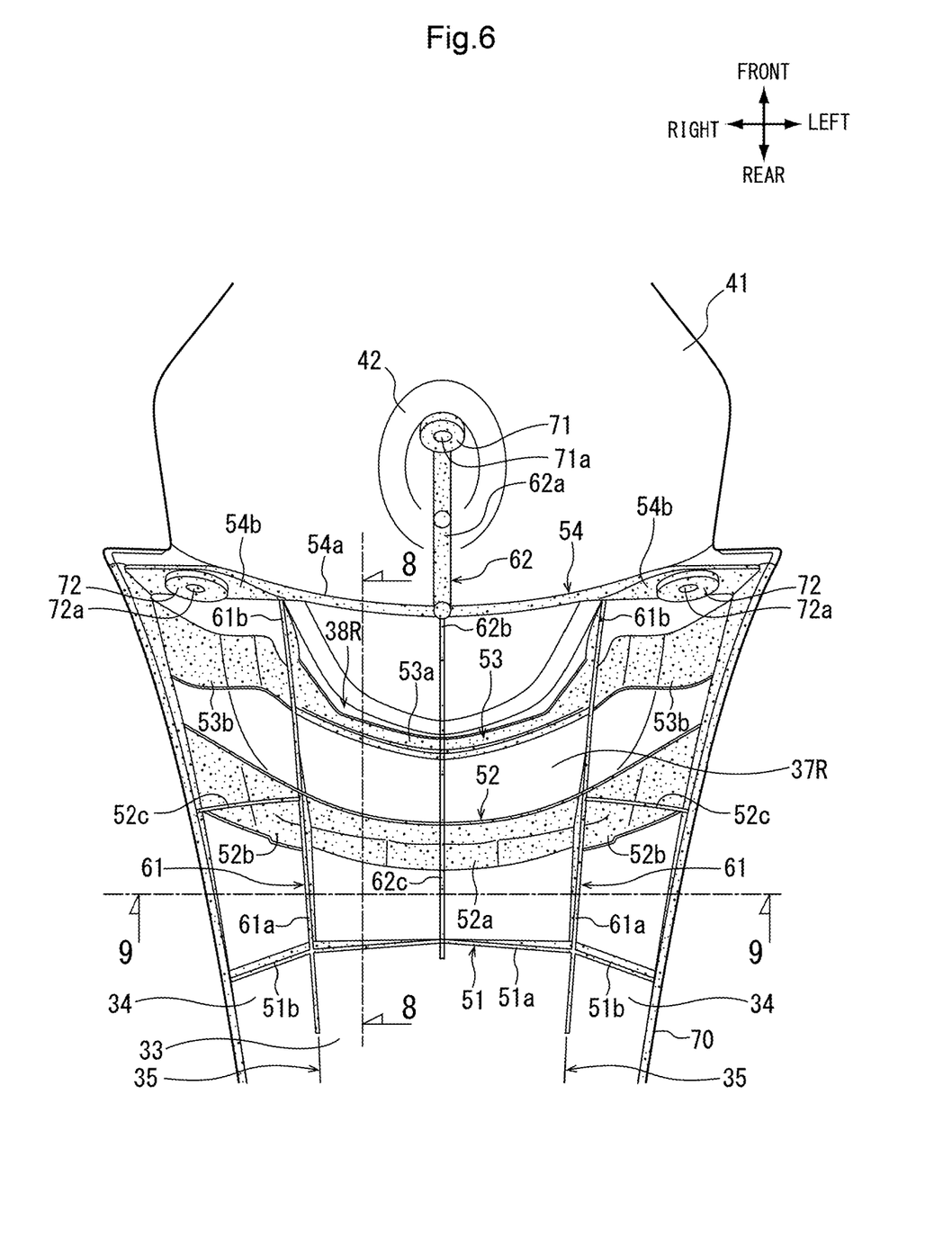
FIG. 6 is an enlarged plan view of a reinforcing rib and its surroundings.
Figure 7:
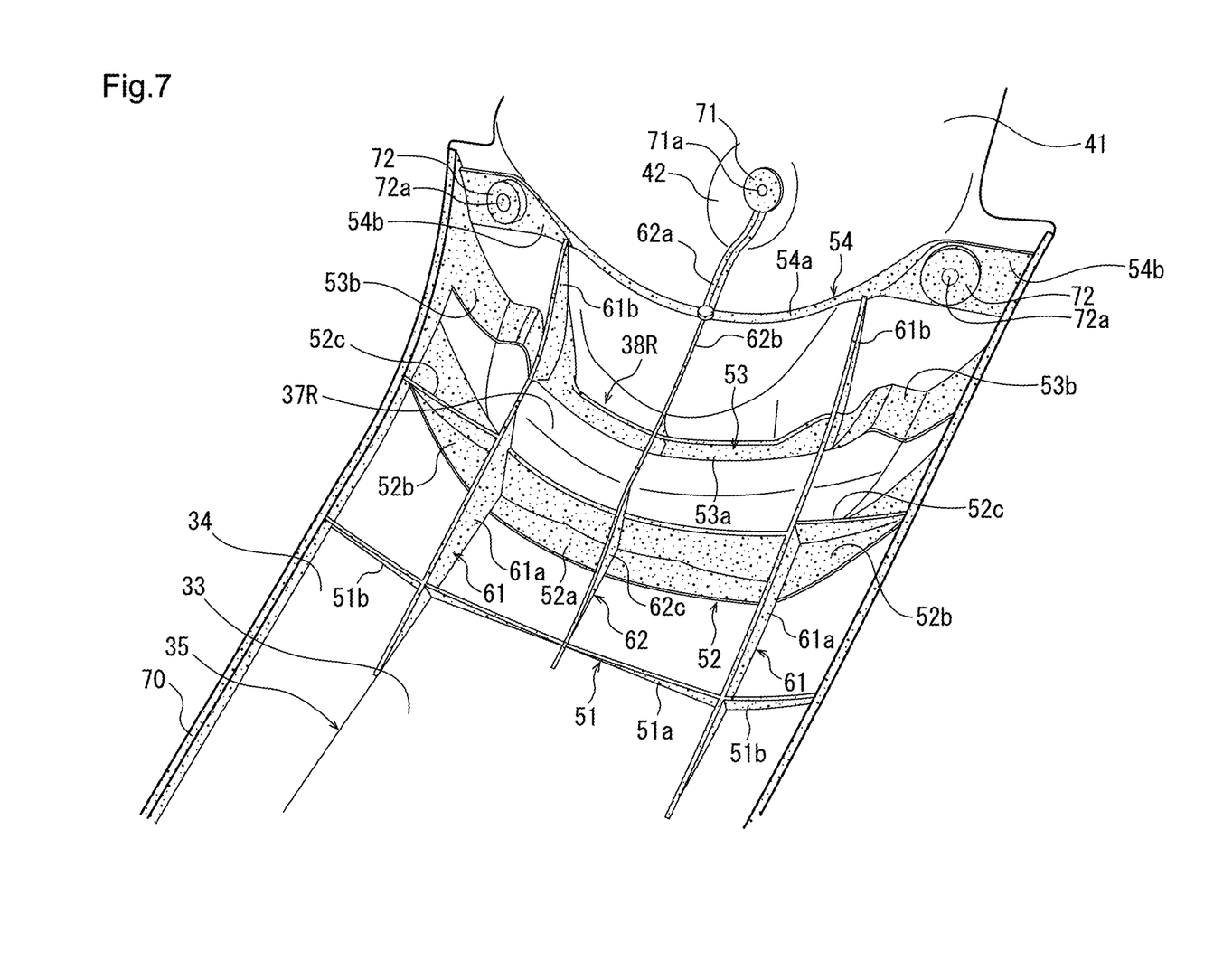
FIG. 7 is an enlarged perspective view of the reinforcing rib and its surroundings.

FIG. 6 is an enlarged plan view of the reinforcing rib 50 and its surroundings. And FIG. 7 is an enlarged perspective view of the reinforcing rib 50 and its surroundings. The pair of left and right first longitudinal ribs 61 is plate-shaped members arranged upright along bends 35 between the top panel 33 and the side panels 34. The crest end of each longitudinal rib 61 is gently inclined from the position of the fourth transverse rib 54 toward the rear of the vehicle body to extend to approximately the center in the longitudinal direction of the top panel 33. In this range, a first longitudinal rib front side 61b and a first longitudinal rib rear side 61a are each shaped into an approximate triangle with a predetermined height dimension, and a portion corresponding to the hill 37R is formed in an extreme thin shape.

Meanwhile, the second longitudinal rib 62 includes: a second longitudinal rib front side 62a connecting the receiving portion 72 and the fourth transverse rib 54: a second longitudinal rib middle side 62b connecting the fourth transverse rib 54 and the third transverse rib 53; and a second longitudinal rib rear side 62c extending from the third transverse rib 53 to the first transverse rib 51. In this range, the second longitudinal rib rear side 62c is shaped into an approximate triangle with a predetermined height dimension, and a portion from the hill 37R to the receiving portion 71, except for a plate-shaped portion for coupling to the third transverse rib 53a, is formed in an extreme thin shape.

With the longitudinal ribs 61, 62 as described above, it is made possible to increase the deformation resistance in the vertical direction of the length extension portion 32. Further, the longitudinal ribs 61, 62 are extended to the center in the longitudinal direction of the length extension portion 32, so that a point of deformation of the length extension portion 32 in the vertical direction is moved toward the rear of the vehicle body, and therefore, when the length extension portion 32 is deformed particularly downward, the possibility that the rear end of the rear fender 30 comes into contact with the rear wheel WR is reduced. However, in order for the longitudinal ribs 61, 62 to take advantage of the effects of deformation resistance as described above, it is necessary to inhibit the deformation and separation of the longitudinal ribs 61, 62. In this respect, the four transverse ribs overlap the three longitudinal ribs to form a grid pattern, so that the transverse and longitudinal ribs have a role in increasing the mutual strengths.

The first transverse rib 51 includes: a first transverse rib inner side 51a connecting the second longitudinal rib rear side 62c and the first longitudinal rib rear sides 61a; and first transverse rib outer sides 51b connecting the first longitudinal rib rear sides 61a and the molding member 70.

The second transverse rib 52 includes: a second transverse rib inner side 52a supporting the second longitudinal rib rear side 62c and the first longitudinal rib rear sides 61a; second transverse rib outer sides 52b serving as a plate-shaped portion which extends outward in the vehicle-width direction from the second transverse rib inner side 52a to be coupled to the molding member 70; and approximately triangular upright portions 52c arranged upright from the second transverse rib outer sides 52b.

With the first transverse rib 51 and the second transverse rib 52 as described above, the side panel 34 can be made to resist rocking relative to the top panel 33, that is, it is possible that the U-shaped cross-sectional shape is not easily altered even when an external force is applied to the length extension portion 32.

The third transverse rib 53 includes: a third transverse rib inner side 53a inserted in the valley 38R to support the first longitudinal rib front side 61b; and third transverse rib outer sides 53b connecting the first longitudinal rib front sides 61b and the molding member 70. The third transverse rib inner side 53a is formed in a U-shape in cross section, and the third transverse rib outer side 53b is formed in a plate shape.

Further, the fourth transverse rib 54 includes: a fourth transverse rib inner side 54a connecting the second longitudinal rib front side 62a and the first longitudinal rib front sides 61b; and fourth transverse rib outer sides 54b connecting the first longitudinal rib front sides 61b and the molding member 70. The fourth transverse rib inner side 54a is formed in a bar shape and the fourth transverse rib outer side 54b is formed in a plate shape.

Receiving portions 72, through which through holes 72a are formed, are provided integrally with the pair of left and right fourth transverse rib outer sides 54b. The through holes 72a communicate with the through holes 40 formed in the vertical surface 39 (see FIG. 2). Also, similarly, the receiving portion 71, which is placed at the end of the second longitudinal rib 62, has a through hole 71a, and the through hole 71a communicates with the through hole 43 of the bulge portion 42 (see FIG. 2). As a result, the three receiving portions 71, 72 in all are connected through the longitudinal rib and the transverse rib, and therefore not only the stiffness of the rear fender 30 alone, but also the stiffness for installation to the vehicle body is able to be increased.

As described above, the reinforcing rib 50 according to the present embodiment includes a plurality of longitudinal ribs and transverse ribs which are arranged in a grid pattern on the underside of the length extension portion 32. This makes it possible to use fiber-reinforced resin to obtain the lightweight and thin rear fender 30, and also this makes it possible to improve stiffness of a necessary portion only in an effective manner while reducing material cost. Further, the placement of the reinforcing rib 50 on the underside of the rear fender 30 enables reinforcement of the rear fender 30 without prejudice to outward appearance.

Figure 8:
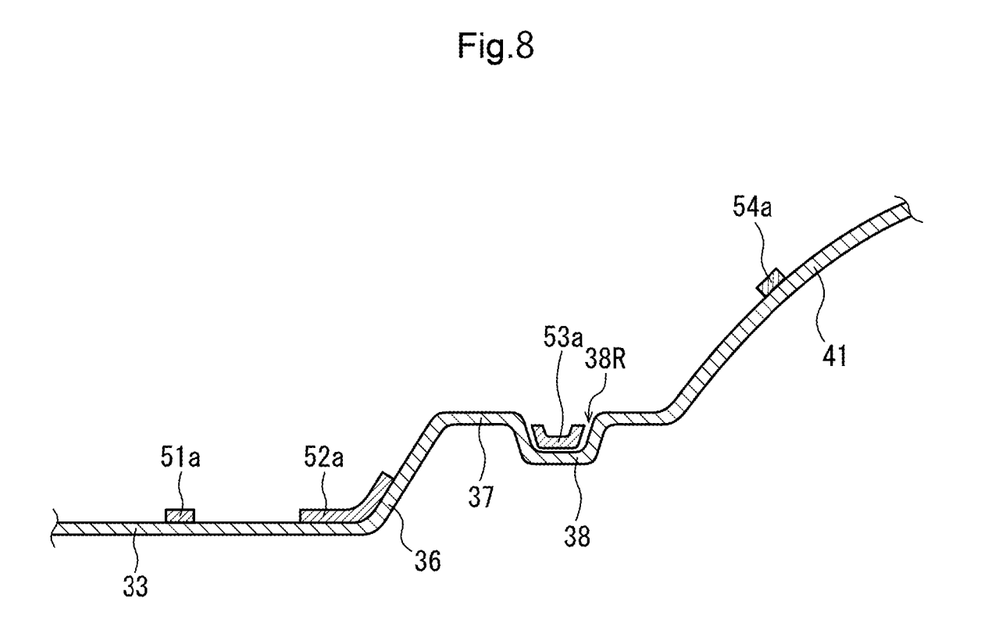
FIG. 8 is a sectional view taken along line 8-8 of FIG. 6.
Figure 9:
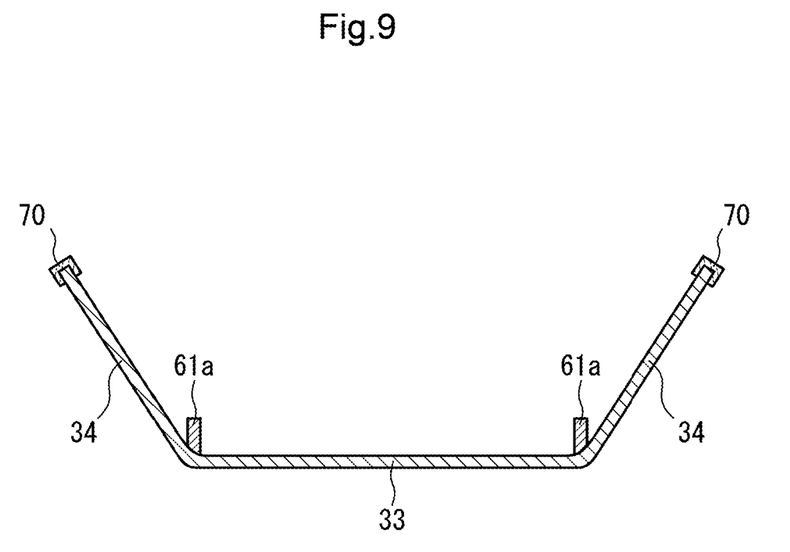
FIG. 9 is a sectional view taken along line 9-9 of FIG. 6.

FIG. 8 is a sectional view taken along line 8-8 of FIG. 6. And FIG. 9 is a sectional view taken along line 9-9 of FIG. 6. Referring to FIG. 8, the second transverse rib inner side 52a, which has a large contact area with an angle in agreement with the bent angle between the inclined surface 36 and the top panel 33, is welded to the underside of the inclined surface 36. Further, the third transverse rib inner side 53a of U-shaped cross section is welded in the valley 38R formed in the underside of the protuberance 38. By virtue of such shape contrivance, the welding strength of the second transverse rib 52 and the third transverse rib 53 is increased and the supporting strength for the longitudinal rib is increased. Further, although the first transverse rib inner side 51a and the fourth transverse rib inner side 54a have a small cross-sectional area and also a small contact area, the load on the first transverse rib inner side 51a and the fourth transverse rib inner side 54a is reduced because the strength of the second transverse rib 52 and the third transverse rib 53 is increased, and also the first transverse rib inner side 51a and the fourth transverse rib inner side 54a are formed integrally with the first longitudinal rib 61 and the second longitudinal rib 62.

Further, referring to FIG. 9, a pair of left and right first longitudinal rib rear sides 61a is arranged upright in the vehicle vertical direction from the bends 35 between the top panel 33 and the side panels 34. As a result, even if the dimensions in the height direction of the two longitudinal ribs 61, 62 are increased, the longitudinal ribs 61, 62 do not extend out from the length extension portion 32, and the stiffness of the rear fender 30 can be more increased.

It should be understood that a form of the motorcycle, a shape and materials of the rear fender, a shape and materials of the reinforcing rib, a method for forming the reinforcing rib, and the like are not limited to the above embodiment, and various changes may be made. For example, the mudguard member according to the present invention may be a front fender covering a front wheel of a vehicle. The mudguard member for a saddled vehicle according to the present invention is not limited to a motorcycle, and may be applied to various types of vehicles such as a saddled three-/four-wheeled vehicle and the like.

EXPLANATIONS OF NUMERALS

1 . . . Motorcycle (saddled vehicle)
20 . . . Seat cowl
21 . . . Seat
30 . . . Mudguard member (rear fender)
31 . . . Vehicle attached portion
32 . . . Length extension portion
33 . . . Top panel
34 . . . Side panel
42 . . . Bulge portion
50 . . . Reinforcing rib
51, 52, 53, 54 . . . Transverse rib (51 . . . First transverse rib, 52 . . . Second transverse rib, 53 . . . Third transverse rib, 54 . . . Fourth transverse rib)
52b . . . Plate-shaped portion (second transverse rib outer side)
52c . . . Upright portion
61, 62 . . . Longitudinal rib (61 . . . First longitudinal rib, 62 . . . Second longitudinal rib)
70 . . . Molding member
71, 72 . . . Receiving portion for a fastening member
WR . . . Rear wheel (vehicle wheel)
WF . . . Front wheel (vehicle wheel)

What is claimed is:

1. A mudguard member for a saddled vehicle, the mudguard member configured to be installed in covering relation above a vehicle wheel, the mudguard member comprising a vehicle attachment portion that is arranged at a first end thereof in a vehicle longitudinal direction, and a length extension portion that extends from the vehicle attachment portion to a second end opposite the first end, wherein the mudguard member is formed from fiber-reinforced resin, the mudguard member has a surface provided with a reinforcing rib made of resin, the surface facing toward the vehicle wheel, and a perimeter edge of the length extension portion is covered with a molding member extending to the reinforcing rib, the molding member having a concave cross-sectional shape, and further wherein:

the mudguard member is formed in a shape elongated in the vehicle longitudinal direction, the length extension portion has a top panel and side panels that extend obliquely downwardly from respective vehicle-widthwise sides of the top panel, and tip portions of peripheral edges of the side panels are covered with the molding member.

2. The mudguard member for a saddled vehicle according to claim 1, wherein the reinforcing rib includes longitudinal ribs that extend from the vehicle attachment portion to a vehicle-longitudinal center of the length extension portion.

3. The mudguard member for a saddled vehicle according to claim 2, wherein one of the longitudinal ribs is placed along a bend located between the top panel and the side panel.

4. The mudguard member for a saddled vehicle according to claim 2, wherein the longitudinal ribs have ends on the vehicle attachment portion side, the ends being coupled to receiving portions for fastening members used to attach the mudguard member to a vehicle body.

5. The mudguard member for a saddled vehicle according to claim 2, wherein the fiber-reinforced resin includes fibers braided in two directions by 90 degrees, and in the length extension portion, the orientation directions of the fibers are inclined 45 degrees with respect to the vehicle longitudinal direction.

6. The mudguard member for a saddled vehicle according to claim 1, wherein the reinforcing rib includes transverse ribs that extend in a direction of a vehicle width, the transverse ribs extending between the vehicle attachment portion and a vehicle-longitudinal center of the length extension portion.

7. The mudguard member for a saddled vehicle according to claim 2, wherein the reinforcing rib includes transverse ribs that extend in a direction of a vehicle width, the transverse ribs being extending between the vehicle attachment portion and a vehicle-longitudinal center of the length extension portion.

8. The mudguard member for a saddled vehicle according to claim 7, wherein the longitudinal ribs and the transverse ribs are coupled to each other.

9. The mudguard member for a saddled vehicle according to claim 8, wherein the longitudinal ribs and the transverse ribs are an integrated member configured by welding resin to a surface of the fiber-reinforced resin.

10. The mudguard member for a saddled vehicle according to claim 7, wherein one of the transverse ribs includes a plate-shaped portion in surface contact with the length extension portion, and an upright portion arranged upright from the plate-shaped portion.

11. The mudguard member for a saddled vehicle according to claim 7, wherein the longitudinal ribs and the transverse ribs are an integrated member configured by welding resin to a surface of the fiber-reinforced resin.

12. The mudguard member for a saddled vehicle according to claim 6, wherein the mudguard member includes a longitudinal rib which is placed along a bend located between the top panel and the side panel.

13. The mudguard member for a saddled vehicle according to claim 6, wherein one of the transverse ribs includes a plate-shaped portion in surface contact with the length extension portion, and an upright portion arranged upright from the plate-shaped portion.

14. The mudguard member for a saddled vehicle according to claim 6, wherein the longitudinal ribs have ends on the vehicle attachment portion side, the ends being coupled to receiving portions for fastening members used to attach the mudguard member to a vehicle body.

15. The mudguard member for a saddled vehicle according to claim 1, wherein the fiber-reinforced resin includes fibers braided in two directions by 90 degrees, and in the length extension portion, the orientation directions of the fibers are inclined 45 degrees with respect to the vehicle longitudinal direction.

16. The mudguard member for a saddled vehicle according to claim 1, wherein the reinforcing rib and the molding member are formed integrally.

* * * * *